United States Patent [19]

Asada et al.

[11] Patent Number: 5,104,718
[45] Date of Patent: Apr. 14, 1992

[54] PREPREG AND PROCESS FOR PRODUCING THE SAME

[75] Inventors: Shiro Asada; Ikuo Takiguchi; Akira Agata, all of Toyohashi; Toshihiro Hattori, Nagoya, all of Japan

[73] Assignee: Mitsubishi Rayon Co., Ltd., Tokyo, Japan

[21] Appl. No.: 481,220

[22] Filed: Feb. 20, 1990

[30] Foreign Application Priority Data

Feb. 28, 1989 [JP] Japan .................................. 1-049624

[51] Int. Cl.$^5$ .............................................. B32B 3/28
[52] U.S. Cl. .................................. 428/167; 428/113; 428/213; 428/220; 428/367; 428/368; 428/542.8; 428/408; 156/196; 156/209; 264/284; 264/293; 264/310; 425/362; 425/363

[58] Field of Search ............... 428/167, 156, 171, 364, 428/367, 397, 399, 113, 131, 213, 220, 244, 368, 408, 688, 542.8; 52/453; 156/196, 209; 264/162, 284, 293, 310; 425/223, 362, 363

[56] References Cited

U.S. PATENT DOCUMENTS

| | | | |
|---|---|---|---|
| 3,935,358 | 1/1976 | Wyeth et al. | 428/107 |
| 4,187,135 | 2/1980 | Yates et al. | 428/56 |
| 4,265,951 | 9/1981 | Yates et al. | 428/35.9 |
| 4,992,127 | 2/1991 | Kishi et al. | 428/136 |

*Primary Examiner*—Ellis P. Robinson
*Assistant Examiner*—Donald J. Loney
*Attorney, Agent, or Firm*—Oblon, Spivak, McClelland, Maier & Neustadt

[57] ABSTRACT

A novel unidirectionally paralleled fiber reinforced thermosetting resin prepreg excellent in moldability which has plural grooves arranged continuously in longitudinal direction on at least one side surface thereof.

7 Claims, 3 Drawing Sheets

PREPREG AND PROCESS FOR PRODUCING THE SAME

FIELD OF THE INVENTION

The present invention relates to a novel unidirectionally paralleled fiber reinforced thermosetting resin prepreg (hereinafter abbreviated as UD prepreg) excellent in moldability and a process for producing the same.

PRIOR ART

UD prepregs obtained by impregnating a reinforcing fiber such as unidirectionally paralleled carbon fiber and aramid fiber with a thermosetting resin such as epoxy resin and converting the resin to a semi-cured state have come to be extensively used as industrial materials such as plate springs and honeycomb structure materials, materials for sporting and leisure goods such as fishing rods and golf shafts and, more recently, as materials for parts of aeroplanes, automobiles, ships, etc.

The processes in use for molding a UD prepreg include the compression molding using a metallic mold, autoclave molding using an autoclave, vacuum bag molding, and sheet lap molding which comprises winding the prepreg in layers round a mandrel, then lapping a plastic film tape thereon followed by curing. An important problem common to these molding processes is how to eliminate voids in the cured molded products.

The voids in molded products are roughly divided into two groups, namely intra-layer voids which develop within respective prepreg layers and interlayer voids which develop between prepreg layers (see FIG. 2). The voids which exert particularly adverse effect on the mechanical property of the molded product are interlayer voids, which develop in relatively large size. The causes of development of voids include volatile matters resulting from water and solvents contained in prepreg resin, bubbles formed from air which has remained in the resin, etc., but the predominant cause of inter layer voids is conceivably accumulated air which has been taken in between the prepreg layers during lamination and left behind there. Accordingly, to obtain a large-sized molded product having a large number of ply in a void-free state in an autoclave etc., it has been necessary to expel the air taken in during lamination by making holes, for each individual lamination ply, with a pin point, cutter blade etc. or to perform, for every several plies, an air venting operation wherein the plies are subjected to bagging with plastic film etc. and then to vacuum deaeration.

On the other hand, in manufacturing fishing rods, golf shafts etc. which involves winding a UD prepreg round a mandrel to effect forming, if a prepreg of excessively strong tackiness is used air is entrapped during winding, resulting in frequent development of interlayer voids; so that an essential point in obtaining good molded products substantially free from voids has been to select a prepreg having a tackiness suppressed within an extent which does not adversely affect the winding operation.

The deaeration operation in autoclave molding requires a great deal of labor and time and, actually, it often occurs that the accumulated air between layers is not completely removed and is left as such in molding, leading to development of interlayer voids. In the sheet lap molding of golf shafts, the inner layer is usually formed by preliminarily laminating UD prepreg at ±45°, followed by cutting in pattern and winding round a mandrel; accordingly if the tackiness of the prepreg is weak the adhesion of laminated parts will become loose, so that the tackiness of the prepreg cannot be made weak. Consequently, it often occurs that air accumulation occurs between the ±45° layers, leading to the presence of voids in molded products.

Also in autoclave molding, when the surface tackiness of UD prepreg is weakened, the frequency of occurrence of accumulation of air taken in between layers during lamination is decreased and void-free, good molded products become easily obtainable. On the other hand, the weak tackiness presents a problem in that, in curved surface molding or the like, the prepreg can be difficulty laminated and, even when once laminated the laminate will readily peel off. Further, when an automatic lay-up machine is used in order to use UD prepreg as a material for parts of large aeroplanes, the prepreg cannot be laminated if it does not have more than a certain extent of tackiness and the deaerating operation by suction under vacuum frequently required necessitates the stoppage of the machine at each time of the operation.

SUMMARY OF THE INVENTION

Thus, characteristic properties requested of UD prepreg are that it has a proper degree of tackiness and that it at the same time can be deaerated well during lamination. The present inventors have made extensive study to obtain UD prepreg which has both of the above-mentioned two properties, namely proper tackiness and good deaeration property, and resultantly attained the present invention.

The essentials of the present invention are a unidirectionally paralleled fiber reinforced thermo-setting resin prepreg having plural grooves arranged continuously in longitudinal direction on at least one side surface thereof and a process for producing the same.

BRIEF DESCRIPTION OF THE DRAWING

The drawings used for illustrating the present invention will be briefly described below.

DESCRIPTION OF THE PREFERRED EMBODIMENT

The present invention will be described in detailed below with reference to the Drawings.

Figure 1A:
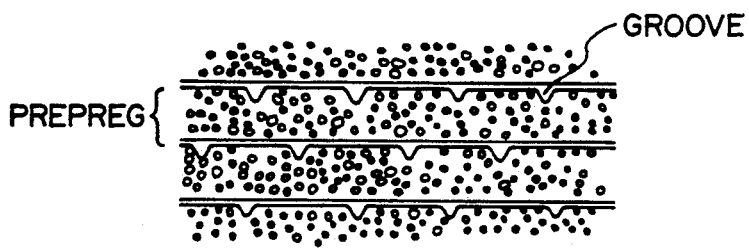
FIG. 1(A) is a sectional schematic view of the prepreg of the present invention after lamination.
Figure 1B:
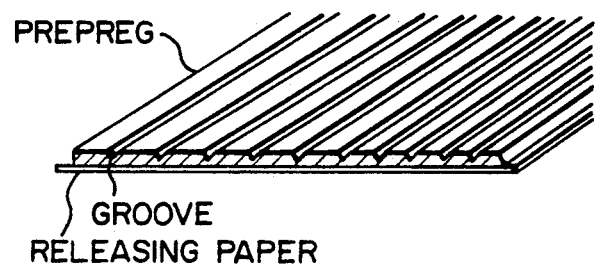
FIG. 1(B) is a schematic view of the prepreg of the present invention supported on release paper.
Figure 2:
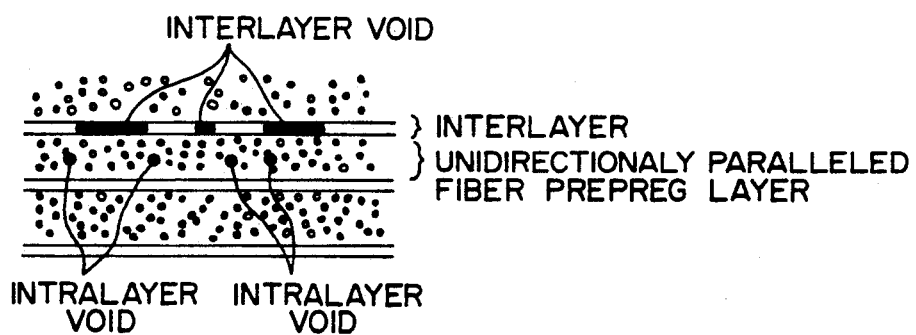
FIG. 2 is a sectional schematic view of the laminated prepreg of the prior art.

The prepreg of the present invention on its surface has grooves continuous in longitudinal direction as shown in FIG. 1(B), so that when the prepreg is laminated as shown in FIG. 1(A) the grooves constitute the passage of air and hence no air accumulation occur. Also at the time of molding, the grooves serve as the passage of resin containing volatile matters and air and, together with the help of lateral shift of fibers surrounding the grooves, ultimately give a good molded products free from interlayer voids.

Figure 3A:
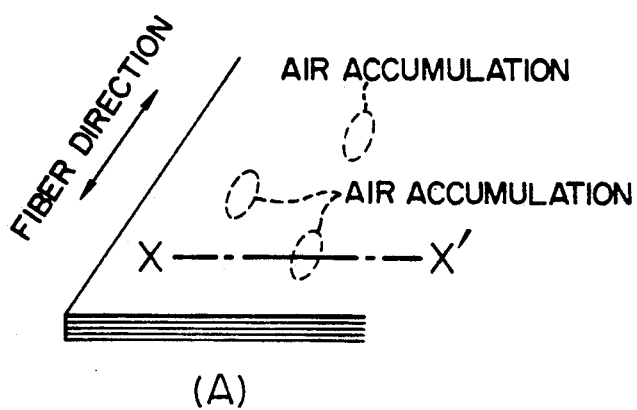
FIG. 3(A) is a schematic diagram showing air accumulations of the laminated prepreg of the prior art.
Figure 3B:
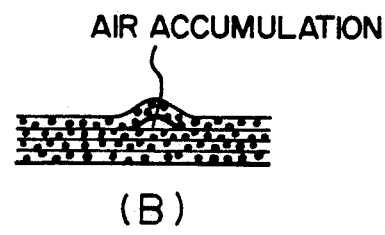
FIG. 3(B) is the side view thereof.

FIG. 3 shows an example of air accumulations generated in laminating the prepreg of the prior art. The X—X¹ section of the air accumulation shown in FIG. 3(A) is shown by a schematic diagram as shown in FIG. 3(B). The air accumulations as shown in FIG. 3 are not easily eliminated by slight pressing, are partly left behind even during application of pressure in molding, and remain as interlayer voids in the molded products.

The prepreg of the present invention, even when having a considerably strengthened surface tackiness, can give a laminate with scarcely any air accumulation merely by laminating it with slight pressing by a hand or roller so long as the grooves are not clogged, and resultantly can provide good molded products virtually free from interlayer voids.

The groove of the prepreg of the present invention has a depth of preferably 15′70%, more preferably 20-50%, relative to the thickness of the prepreg. The pitch of the groove is preferably 0.5-5 mm, more preferably 1-3 mm, though it depends also on the depth of the groove. When the groove is too shallow it is readily clogged during lamination and the effect of the present invention cannot be fully exhibited; whereas when the groove is too deep, the prepreg has a lowered lateral strength and is liable to tear, and the molded product sometimes retains the mark of the groove on the surface. When the pitch of the groove is too small, the groove is difficult to form, the necessary depth and width of the groove cannot be afforded, and the frequency of clogging during lamination increases, which results in a prepreg unsuitable for the present invention. Conversely, when the pitch is too large, the number of grooves per unit area becomes small, the frequency of occurrence of air accumulation increases, and concurrently the shift of resin containing air and volatile matters does not proceed smoothly, resulting in development of many interlayer voids. The width of the groove is preferably 0.2-2 mm, more preferably 0.5-1 mm. When it is less than 0.2 mm the groove is readily clogged, leading to difficulty in deaeration, whereas when it is more than 2 mm, the mark of the groove will remain even after molding and cause the development of voids.

Figure 5:
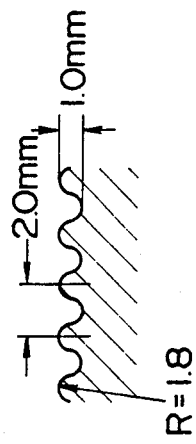
FIG. 5 is a side view of the grooved roll.
Figure 4:
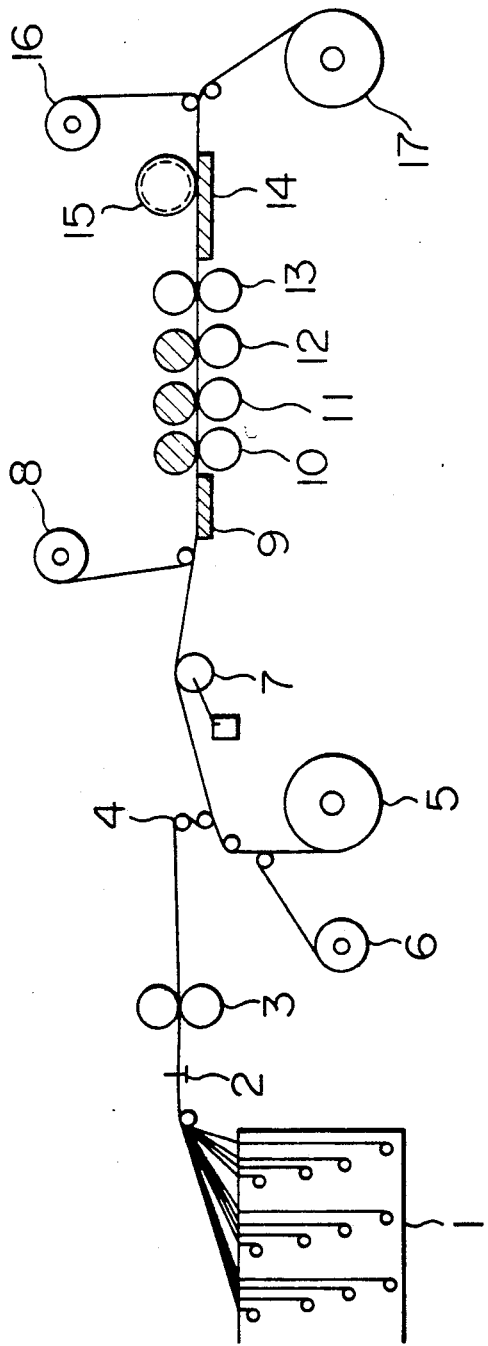
FIG. 4 is a diagram showing an example of equipment for producing the prepreg of the present invention, numeral 1 indicating a feed creel for fiber strand, 14 a preheating plate, and 15 a grooved roll.

The process for producing the prepreg of the present invention comprises pressing against the prepreg surface a so-called grooved roll, a roll having concave parts and convex parts in circumferential direction. In this case, the groove-forming may be conducted on line in the prepreg impregnation step, or it may be performed by an off-line process wherein a prepreg once formed in a prepregnating machine is post-processed with a similar grooved roll. FIG. 4 shows an example of equipment for producing the prepreg of the present invention and FIG. 5 shows an example of surface machining of a grooved roll suited for use in the present invention.

In FIG. 4, numeral 1 indicates a feed creel for fiber strand, 2 a comb, 3 a feed nip roll, 4 an opening bar for fiber strand, 5 a hot melt resin film obtained by coating a thermosetting resin on double-side silicone release paper, 6 a take-up shaft for polyolefin film used for covering the hot melt resin film, 7 a dancer roll for tension control, 8 covering polyolefin film used for preventing rolls from staining by resin, 9 a preheating plate heater for impregnation, 10, 11 and 12 heating nip rolls for impregnation, 13 a traction nip roll concurrently serving as a cooling roll, 14 a preheating plate heater for groove-forming, and 15 a grooved roll. Between the roll and the preheating plate 14, is nipped the prepreg and grooves are formed thereon. Numeral 16 indicates a take-up shaft for the covering polyolefin film and 17 a take-up roll for products.

In forming grooves on the prepreg in the equipment shown in FIG. 4, the temperature of the preheating plate 14 is important. Though the temperature may vary depending also on nip pressure, resin viscosity, resin content of prepreg, prepreg thickness, production velocity etc., it is preferably 35°-85° C., more preferably 40°-60° C. When the heating temperature in groove-forming is too high, resin will be squeezed out, resulting in formation of resin accumulation and lateral flow, which leads to uneven resin content of the prepreg, whereas when it is too low groove-forming is difficult.

The prepreg of the present invention may also be obtained, without using a grooved roll, for example by such a groove-forming method as pressing against the prepreg surface an embossing paper having irregular parts arranged in the longitudinal direction. Even when no groove-forming operation is applied, grooves are sometimes formed at parts between adjacent two fiber strands in the prepreg-forming step. These grooves, however, are small and are not formed under any control, so that they are unable to exhibit an effect as obtainable by the present invention.

The unidirectionally paralleled fibers used in the present invention are those of carbon fiber, all-aromatic polyamide fiber, glass fiber, polyetheretherketone fiber, polybenzimidazole fiber, etc.

EXAMPLE

The present invention will be described below with reference to Examples.

EXAMPLE 1 AND COMPARATIVE EXAMPLE 1

Figure 6:
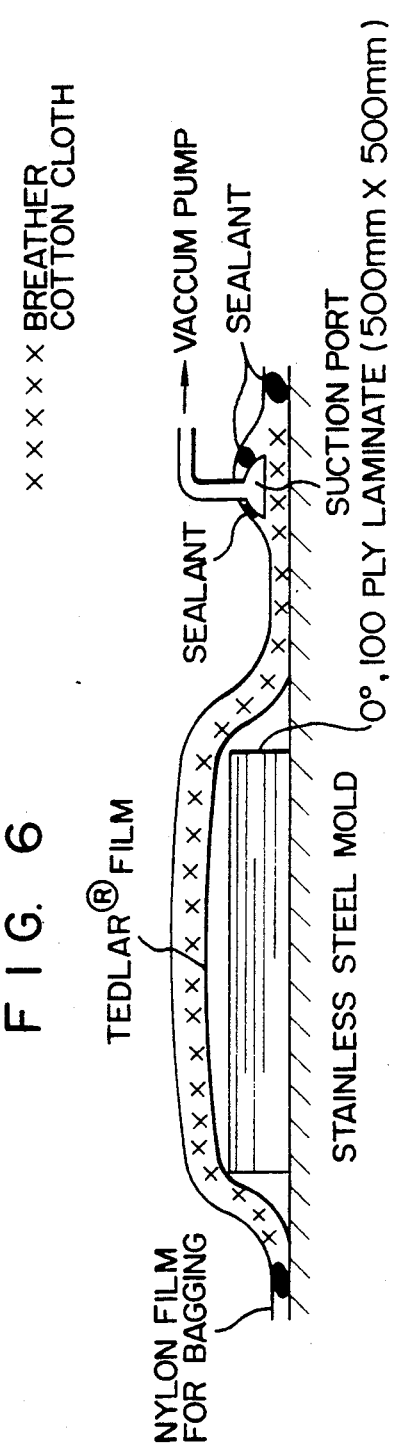
FIG. 6 is a schematic diagram showing a deaeration apparatus for prepreg production.
Figure 7:
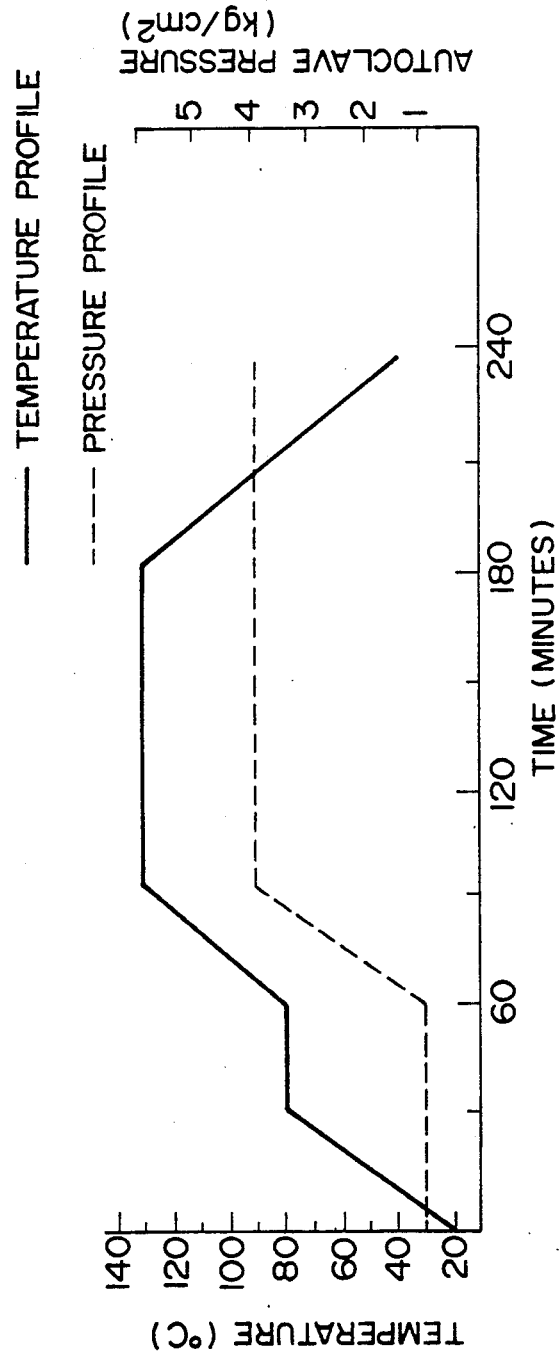
FIG. 7 is a graph showing profiles relating prepreg curing time with temperature and pressure.
Figure 8:
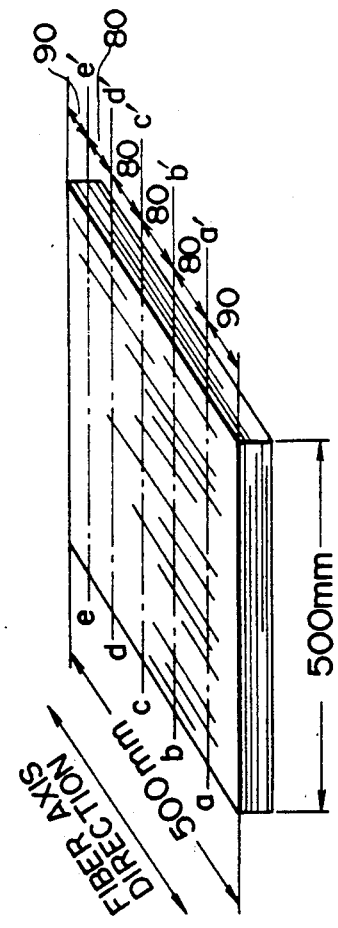
FIG. 8 is a schematic diagram showing cutting lines of a molded product of the prepreg.

A UD prepreg was prepared aiming at a weight of fiber per unit area of 150 g/m² and a resin content of 35% by weight with application of a groove-forming treatment at 50° C. by using a carbon fiber (tensile strength: 360 kg/mm², tensile modulus: 24 ton/mm², 12,000 filaments) and a silicone double-side releasing paper coated with 250° F.-cure type epoxy resin and by the use of a grooved roll having been grooved as shown in FIG. 5 in the prepreg production equipment shown in FIG. 4. For comparison, a prepreg to which no groove-forming treatment was applied was also prepared by opening the nip of the grooved roll. The surface roughness of the both prepregs was examined with an optical roughness meter (high precision laser displacement meter LC-2000-2010, mfd. by KEYENCE K.K.) and the depth of groove thus obtained are shown in Table 1. These prepregs were respectively laminated in 100 plies with no deaerating operation being applied in the course of lamination and then covered with a nylon bag as shown in FIG. 6. They were then subjected to an autoclave molding while suction by vacuum was being applied at a degree of vacuum of 755 mmHg or more, in accordance with the curing schedule shown in FIG. 7. The molded products thus obtained were respectively cut at 5 spots, namely a-a' plane, b-b' plane, c-c' plane, d-d' plane and e-e' plane, as shown in FIG. 8. The cut plane was polished and the number of more in size were determined under an optical microscope. The results obtained are shown in Table 1.

TABLE 1

| | Fiber weight per unit area (g/m$^2$) | Resin content (wt %) | Prepreg thickness/1 ply (μm) | Groove depth (μm) | Number of interlayer voids | | | | | | Grade*** |
|---|---|---|---|---|---|---|---|---|---|---|---|
| | | | | | a-a' plane | b-b' plane | c-c' plane | d-d' plane | e-e' plane | total | |
| Example 1 | 150.5 | 34.9 | 183 | 63 | 0 | 0 | 0 | 0 | 0 | 0 | ○ |
| Comparative Example 1 | 150.1 | 35.0 | 168 | 13* | 0 | 1 | 9 | 6 | 3 | 19 | X |
| Example 2 | 126.0 | 37.1 | 161 | 45 | 0** | | | | | | ○ |
| Comparative Example 2 | 126.2 | 37.2 | 140 | 11* | 11** | | | | | | X |

Note:
*The depth of grooves which develop between two fiber strands at the prepregnation step (not those formed by a grooved roll).
**Total number of 4 cross sections.
*** ○ Good molded product free from voids.
X Molded product having many voids which may cause remarkable deterioration in mechanical properties.

interlayer voids 50 μm or more in size was counted under an optical microscope. The results are shown also in Table 1. The thickness of prepreg shown in Table 1 was determined with a dial gauge-type cloth thickness meter.

EXAMPLE 2 and COMPARATIVE EXAMPLE 2

Figure 9:
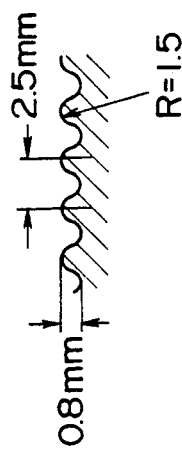
FIG. 9 is a side view of another grooved roll.

A prepreg of the present invention having grooves formed thereon was prepared aiming at a weight of fiber per unit area of 125 g/m$^2$ and a resin content of 37.5% by weight by the use of the same prepreg production equipment as that used in Example 1 except for changing the grooved roll to a roll which had been grooved as shown in FIG. 9 and by using the same carbon fiber and the silicone side release paper coated with 250° F.-cure type epoxy resin as those used in Example 1. For comparison, a prepreg having no groove formed thereon was prepared in the same manner as in Example 2. These prepregs were respectively laminated at ±45° and wound in 3 plies round an iron mandrel 10 mm in diameter. Then, polypropylene film tape 30 μm in thickness and 15 mm in width was wound thereon under a tension of 4 kg/width and heat-treated at 130° C. for 1 hour. Thus, pipes 500 mm in length were molded. These pipes were cut at 4 spots at intervals of 100 mm in longitudinal direction, the cut planes were polished, and the numbers of interlayer voids 30 μm or more in size were determined under an optical microscope. The results obtained are shown in Table 1.

What is claimed is:

1. A unidirectionally paralleled fiber reinforced thermosetting resin prepreg which has a plurality of grooves arranged continuously in longitudinal direction on at least one side surface thereof, wherein the depth of said groove is 15-70% relative to the thickness of said prepreg and the pitch of said groove is 0.5-5 mm.

2. A prepreg according to claim 1 wherein the fiber is carbon fiber.

3. A process for producing a prepreg according to claim 1 which comprises forming on the surface of a unidirectionally paralleled fiber reinforced thermo-setting resin prepreg plural grooves arranged continuously in longitudinal direction, with a roll having concave parts and convex parts formed in circumferential direction.

4. A process according to claim 3 wherein the groove-forming is conducted at 35°-85° C.

5. A prepreg according to claim 1, wherein the width of said groove is in the range of from 0.2-2 mm.

6. A prepreg according to claim 1, wherein the width of said groove is in the range of from 0.5-1 mm.

7. A prepreg according to claim 1, wherein the depth of said grove is 20-50% relative to the thickness of said prepreg.

* * * * *